United States Patent [19]

Dimmer

[11] Patent Number: 5,288,123
[45] Date of Patent: Feb. 22, 1994

[54] BOW COVER

[75] Inventor: Jerry Dimmer, Yankton, S. Dak.

[73] Assignee: Wahpeton Canvas Co., South Dakota, Inc., Yankton, S. Dak.

[21] Appl. No.: 7,558

[22] Filed: Jan. 22, 1993

[51] Int. Cl.$^5$ .............................................. B60P 7/02
[52] U.S. Cl. .................... 296/100; 296/104; 296/118
[58] Field of Search ............... 296/100, 98, 104, 105, 296/118

[56] References Cited

U.S. PATENT DOCUMENTS

| | | | |
|---|---|---|---|
| 1,439,238 | 12/1922 | Hill | 296/118 |
| 1,458,781 | 6/1923 | Schemmel | 296/118 |
| 2,138,508 | 11/1938 | Plym et al. | 296/118 |
| 2,823,951 | 2/1958 | Stahl | 296/118 X |
| 5,080,423 | 1/1992 | Merlot et al. | 296/118 X |

FOREIGN PATENT DOCUMENTS 163238  5/1921  United Kingdom ............... 296/104

Primary Examiner—Joseph D. Pape
Attorney, Agent, or Firm—Jones, Day, Reavis & Pogue

[57] ABSTRACT

A protective cover for a bow element adapted for connection laterally of a truck body having an opening for supporting a canvas cover and including a rectangular pliable member substantially equal in length to the elongated bow and having a width sufficient to substantially surround the elongated bow. At least one male and female fastening member is on opposing sides of the pliable member such that the pliable member can be folded around the bow member and attached thereto with the mating female and male fasteners.

32 Claims, 3 Drawing Sheets

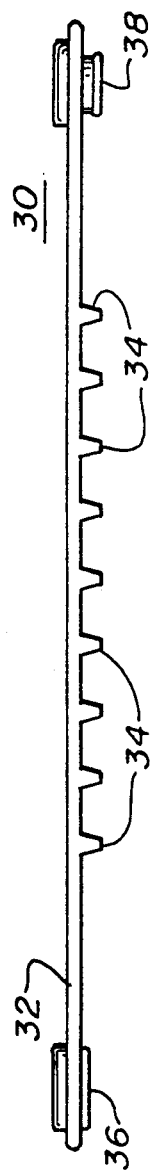
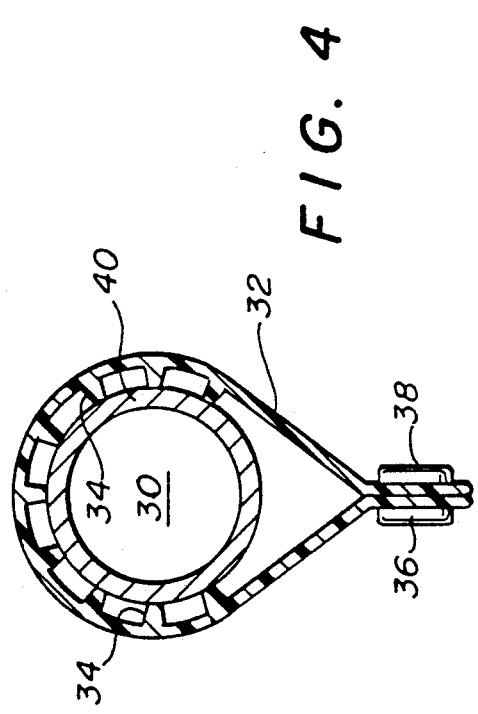
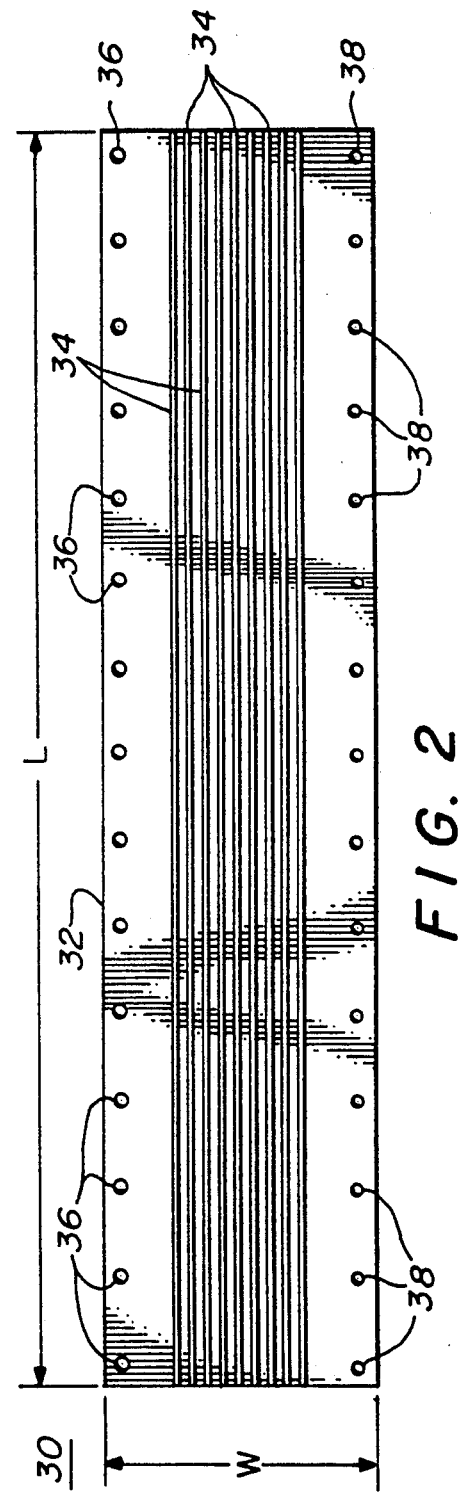
FIG. 3
FIG. 4
FIG. 2

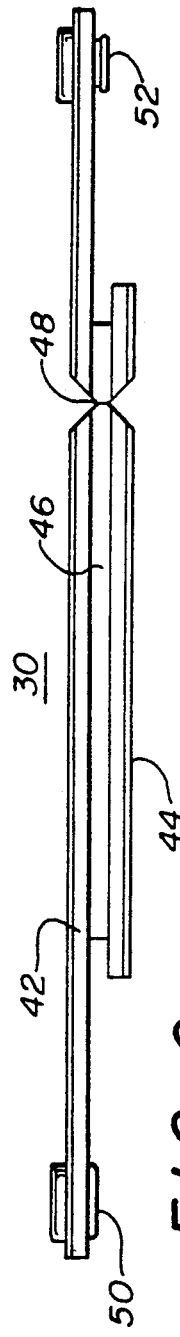
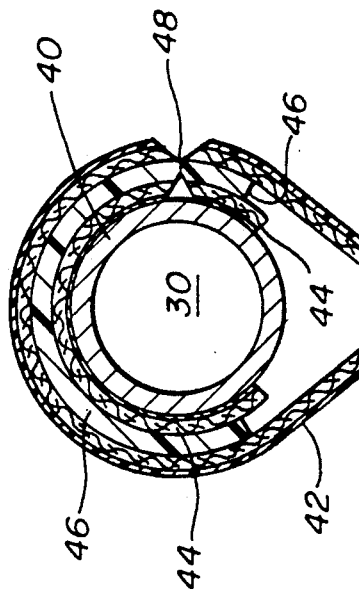
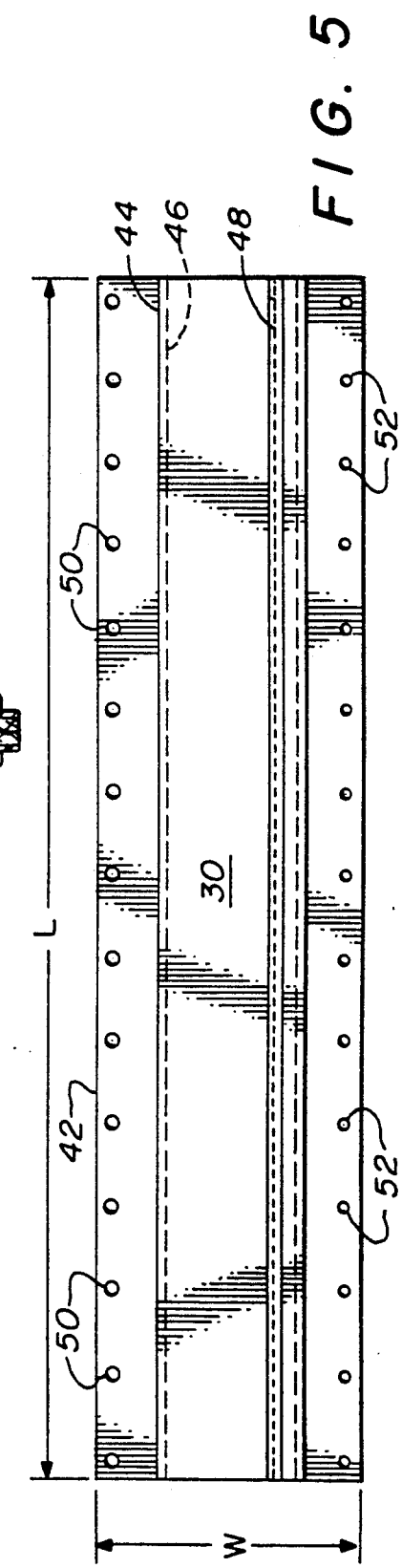

BOW COVER

BACKGROUND OF INVENTION

(1) FIELD OF THE INVENTION

The present invention relates in general to a protective cover for an elongated support member and in particular to a protective cover for a tarp bow used on truck bodies having an open top, the tarp bows supporting a tarp that covers the open top.

(2) DESCRIPTION OF RELATED ART

As disclosed in U.S. Pat. No. RE.31,746, various types of truck and trailer bodies are designed to be loaded through an open top. This creates the necessity for a cover which can be easily attached to the open top to inhibit the free flow of material out of the truck or trailer body or box during high speed movement thereof. A plurality of bows are attached to the top of and transversely of the sides of the truck body or box. These bows support a cover that is attached to the open top to inhibit the free flow of material out of the truck or trailer body. The cover is a tarpaulin or tarp, generally made of canvas, plastic or other flexible material.

These bows can be an unwelcome source of premature tarp wear. Generally the bows are made of metal and rust, welding spatter, sharp corners, irregularities, bow movement, tarp flutter caused by the wind, and aggravation related to the movement of a canvas roll tube across the bows causes vinyl delamination and all of these elements play a part in tarp wear.

Further, a ridge strap runs longitudinally of the truck body and crosses each bow. The ridge strap runs from the front of the box down the center to the back of the box. This strap crosses the top of each bow touching it lightly and assists in supporting the tarp. Ridge strap wear occurs at these points of crossing. When a box is untarped in windy conditions, the ridge strap will oscillate causing the strap to flutter on each bow. This flutter action causes wear on the strap due to the harder bow surface.

In addition, metal bows, both steel and aluminum, tend to leave an imprint, i.e. a black mark, on the tarp where every bow touches it. As the tarp is rolled from one side of the box to the other with a roll tube, this black mark on the bottom side of the tarp is transferred to the top side of the tarp. On lighter colored tarps, this long black mark is clearly visible and unsightly. Truckers with this situation spend a great deal of time and money keeping the appearance of their tarp looking reasonable.

Finally, excessive grain splatter has been a concern for many year. Kernels of grain falling from an elevated conveying tube or combine auger hit the bow with such force that a great many of them bounce out of the truck and over the sides of the truck box. This grain loss is wasteful and aggravating.

SUMMARY OF THE INVENTION

The present invention relates to a bow cover that effectively solves all of the problems previously listed. The present invention provides a bow cover with an appropriate material having the proper structure that significantly reduces tarp wear, ridge strap wear, black mark transfer and grain splatter. Bows covered in the manner disclosed hereafter enable considerable life to be added to a tarp system in the bow area while promoting cosmetic value, cost effectiveness and reduction of product waste.

In the preferred embodiment of the present invention, a flat vinyl extrusion of sufficient length to effectively cover the bow end to end and having a width sufficient to wrap around the bow tube is formed of a vinyl material and has a plurality of extrusions on the side facing the bow tube such that the elongated vinyl extrusion can be wrapped around the bow tube and quickly snapped at the outer ends thereof with male and female snaps. Projections on the bottom side of the extrusion are spaced apart and therefore engage the bow tube only at the spaced locations. Thus, in this embodiment, a rectangular pliable member substantially equal in length to the elongated support member has a width sufficient to surround the elongated support member or bow tube. At least one male fitting or fastening member is on one side of the pliable member and at least one mating fastening member is on the other side of the pliable member such that the pliable member can be placed around the elongated bow tube and attached thereto with the mating fasteners.

In a second embodiment, the rectangular pliable member is also substantially equal in length to the elongated bow tube and also has a width sufficient to surround the elongated bow. It also includes a first layer of compressible material abutting the pliable rectangular member but smaller in width and a second layer of material having at least a vinyl coating thereon that is attached to both the rectangular pliable member and the compressible material layer such that the vinyl-coated second layer contacts the elongated bow when the elongated pliable member is wrapped around the bow. The second layer of material is wider than the first layer of compressible material but is smaller in width than the rectangular pliable member. In this embodiment, the pliable member is formed of at least a vinyl-coated fabric or, alternatively, extruded vinyl, the first layer of compressible material abutting the rectangular pliable member is formed of closed cell foam and the second layer of material is formed of at least a vinyl-coated material or, alternatively, extruded vinyl. Again, the rectangular pliable member has mating fastening members on each side thereof such that, when the three layers of pliable members are folded around the bow, they are attached thereto with the mating fasteners.

Thus, it is a feature of the present invention to provide a tarp bow cover that reduces premature tarp wear caused by rust, weld spatter, sharp corners, irregularities in the bow shape, bow movement, tarp flutter from the wind and roll tube aggravation.

It is another feature of the present invention to provide a bow cover that reduces ridge strap wear caused by the ridge strap fluttering on each bow and thus causing wear of the ridge strap.

It is yet another feature of the present invention to provide a bow cover for metal bows to prevent the metal bows from causing a black mark on the bottom side of the tarp and which, as the tarp is rolled from one side of the box to another to cover and uncover the box, is transferred to the top side of the tarp.

It is also a feature of the present invention to provide a bow cover having a shape and being formed of a material that reduces grain splatter from grain striking the bows at some angle with such force that they are caused to bounce over the truck box sides.

It is an important feature of the present invention to provide a bow cover from a rectangular pliable member substantially equal in length to the bow body and having a width sufficient to surround the elongated bow body, at least one fastening member is formed on one side of the pliable member and a mating fastening member is formed on the other side of the pliable member such that the pliable member can be folded around the elongated bow body and attached thereto with the mating fasteners.

It is still another important feature of the present invention to provide a bow cover formed of a rectangular pliable member substantially equal in length to the elongated bow body and having a width sufficient to substantially surround the elongated bow tube and having a first layer of compressible material abutting the rectangular pliable member and a second layer of material having at least a vinyl coating thereon attached to both the rectangular pliable member and the compressible material layer such that the vinyl coat contacts the elongated bow tube when placed around the bow tube.

BRIEF DESCRIPTION OF THE DRAWINGS

These and other features of the present invention will be more fully disclosed in the following detailed description of the drawings in which like numerals represent like elements and in which:

FIG. 2 is a bottom view of the rectangular pliable bow cover illustrating a plurality of spaced elongated ribs or extrusions formed thereon;

FIG. 3 is an end view of the preferred embodiment of the bow cover illustrated in FIG. 2 and that can be placed on a bow tube;

FIG. 4 is a cross-sectional view of one of the covered bow tubes in FIG. 1 illustrating the contact of the extrusions or ribs on the bottom of the rectangular pliable member with the outer surface of the bow tube;

FIG. 5 is a bottom view of an alternate embodiment of a rectangular pliable member substantially equal in length to the bow tube and having a width sufficient to substantially surround the bow tube;

FIG. 6 is a end view of the rectangular pliable member of FIG. 5 that is formed of a first layer of vinyl-coated fabric, a second layer of closed cell foam and a third layer of vinyl-coated fabric stitched together to form a unitary rectangular pliable member; and FIG. 7 is a cross-sectional view of one of the bow tubes in FIG. 1 with the alternate embodiment rectangular pliable member illustrated in FIG. 5 and FIG. 6 substantially surrounding the bow tube.

DETAILED DESCRIPTION OF THE DRAWINGS

Figure 1:
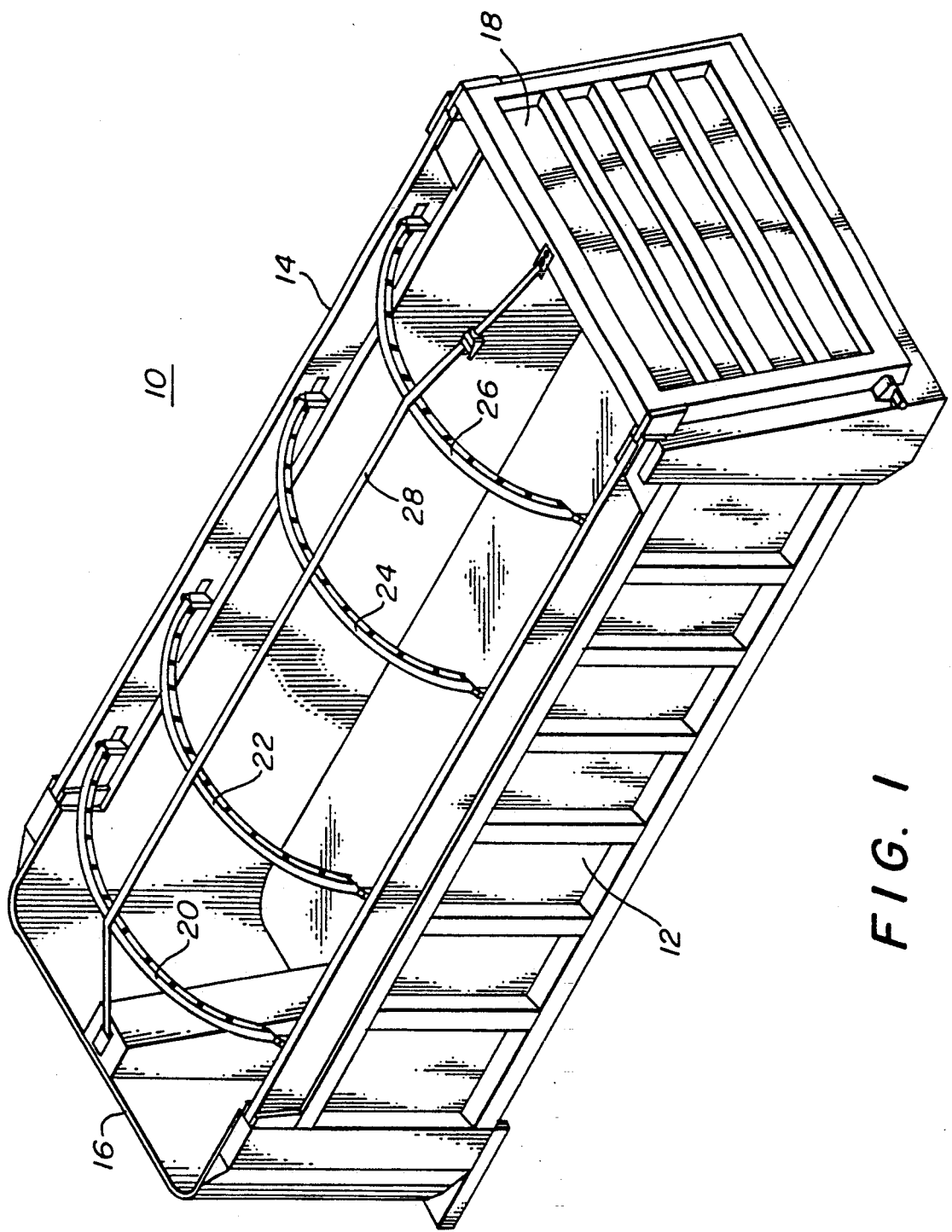
FIG. 1 is an isometric view of an open-top truck body illustrating bow covers and a ridge strap for supporting a tarpaulin that can be placed over the open top of the truck body.

An isometric view of a truck body 10 having an open top is disclosed in FIG. I. It has first and second sides 12 and 14, a front 16 and a back 18. As indicated, the top is open. A plurality of covered bow tubes 20, 22, 24 and 26 extend in spaced relationship with each other from the top of side 12 to the top of side 14 of the truck body 10. A ridge strap 28 runs from the center top portion of the front 16 to the center top portion of the back 18. As is well known in practice, a tarp or canvas may be placed over the open top of the truck in various ways including a roll-up tarp as illustrated in U.S. Pat. No. Re.31,746. Other covers may be placed over the top and lashed to the sides. In any event, the bow tubes 20, 22, 24 and 26 can have rust, welding spatter, sharp corners and irregularities that damage the tarp that is placed over them. Further, movement of the bows 20, 22, 24 and 26, tarp flutter from the wind and damage caused by the roll tube holding the canvas and carrying the canvas from one side of the truck to the other all contribute to wear of the tarp. Further, where the ridge strap 28 contacts each of the bow tubes 20, 22, 24 and 26, undue wear is placed on the ridge strap due to the hard bow tube surface.

Further, the bow tubes 20, 22, 24 and 26 on which the bow covers are placed are generally metal and both steel and aluminum leave an imprint in the form of a black mark on the tarp where the bow touches it.

Finally irregular shaped areas on the bow, or bows formed of rectangular shapes, obviously cause kernels of grain striking them to be forced to change angles of direction and thus cause many of them to bounce over the box sides onto the ground. The bow tube covers are placed around the bow tubes 20, 22, 24 and 26 as shown and tend to alleviate all of these problems as will be shown in relation to FIGS. 2–7.

FIG. 2 is a bottom view of the novel bow cover 30 of the preferred embodiment which includes a rectangular pliable member 32 substantially equal in length, L, to the elongated bow tube and having a width, W, sufficient to substantially surround the elongated bow tube is illustrated. A plurality of parallel, spaced ribs 34 are shown on the bottom of the rectangular pliable member 32 for contacting the elongated bow tube to maintain the pliable member 32 in spaced relationship with the bow tube. The spaced ribs 34 are shown parallel to the length, L, of the rectangular pliable member 32. However, it can be seen that the spaced ribs could be placed transversely of the length of the rectangular pliable member 32 provided that the member 32 is sufficiently pliable. As can be seen in FIG. 2, a plurality of female snaps 36 extend in spaced relationship down one side of the rectangular pliable member 32 while a like plurality of spaced male fasteners 38 extend down the other side of the rectangular pliable member.

In FIG. 3, an end view of the rectangular pliable member 32 shown in FIG. 2 and taken along lines 3—3 is shown. The rectangular pliable extrusion member 32 may be formed of vinyl and has the parallel spaced ribs or projections 34 extending therefrom and along the length thereof as shown in FIG. 2. The female snap 36 has an opening for receiving the male snap 38 in any well-known fashion to latch the two edges or sides of the rectangular pliable member 30 together.

This can be seen more clearly in FIG. 4 which is a cross-sectional view of one of the covered bow tubes in FIG. 1. As can be seen in FIG. 4, the rectangular pliable member has been substantially wrapped around the bow tube 40 with the vinyl projections or ribs 34 contacting the bow tube 40 at various spaced intervals around the circumference thereof. The male and female snaps 36 and 38 are attached together to hold the rectangular pliable member 30 on the bow tube 40. The rectangular pliable member is preferably made of vinyl with the extrusions or ribs 34 integrally formed therewith and extending outwardly therefrom.

As can be seen in FIG. 4, any rust, welding spatter, sharp corners and/or irregularities on a metal bow tube 40 are effectively covered by the rectangular pliable member 30. Further, when the ridge strap 28 in FIG. 1 flutters and slaps against the bow tube cover 30, the ridge strap wear will be less because of the smooth surface of the vinyl material which has less wearing effect on the ridge strap than metal. Further, the vinyl material with which the rectangular pliable member 30 is formed will not leave an imprint or black mark on the tarp where every bow cover touches it. Finally, because of the smooth surface on the vinyl material, the grain will not be deflected to as great an extent as when it strikes metal. Further, if the bows are formed in any other shape than cylindrical, the reduction in grain loss will be even greater because of the generally cylindrical shape of the bow cover as it surrounds the bow 40.

FIG. 5 is a view of an alternate embodiment of the novel bow cover 30. It has a rectangular pliable member 42 that is substantially equal in length, L, to the length of the elongated bow or bow tube and has a width, W, sufficient to substantially surround the elongated bow tube or member. The rectangular pliable member 42 has a contact surface 44 associated with the bottom of the rectangular pliable member 42 for abutting the elongated bow member or bow tube to maintain the pliable member 42 in spaced relationship with the bow member or bow tube 40. The contact surface or layer 44 includes a first layer 46 of compressible material such as closed cell foam that abuts and is attached to the rectangular pliable member 42. It also has a second layer of material 44 having at least a vinyl coating thereon and attached to both the rectangular pliable member 42 and the compressible material 46 as by sewing along seam 48 such that the vinyl coat of the fabric 44 contacts the elongated bow member or tube when folded around the bow member or tube 40. The second layer of material 44 may be formed entirely of extruded vinyl plastic or may be formed of a pliable material having a vinyl coating thereon.

As in the preferred embodiment, the rectangular pliable member is substantially equal in length, L, to the bow member or tube and has a width, W, sufficient to surround the bow member or tube. It also has a plurality of male fastening members 50 extending down one side of the rectangular pliable member 42 in spaced relationship with each other and a second plurality of mating female fastening members of the other side of the member 42 extending down the side thereof in corresponding spaced relationship with each other. The first layer of material 46 may be formed of a material such as closed cell foam for compressibility. The three layers, including the rectangular pliable member 42, the first layer of compressible material 46 and the second layer of vinyl-coated fabric 44 may be attached to each other in any well-known manner such as by sewing a seam 48 or by the use of an appropriate adhesive.

FIG. 7 is a cross sectional view of a bow tube 40 having the alternate embodiment of the bow tube cover 30 wrapped around it. As can be seen in FIG. 7, the rectangular pliable member 42 has its outer edges joined together with the male and female fasteners 50 and 52. The vinyl-coated fabric 44 on the inside thereof contacts the bow tube 40 while the compressible material 46 is maintained between the vinyl-coated fabric 44 and the outer vinyl material 42.

Again, with this embodiment, the problems associated with bow members or structures are alleviated. First, any rust, welding spatter, sharp corners or irregularities are covered up by the bow cover 30 as shown in FIG. 7. Second, because of the flexible smooth material forming the bow cover 30, ridge strap wear is alleviated. In addition, the vinyl-coated fabric will not leave a black mark on the tarp where every bow touches it. Again, because of the smooth surface, excessive grain splatter will be alleviated.

Instead of using mating fastening devices such as male and female snaps, any type of fastener could be used including a seam pre-formed by gluing, stitching, heat sealing and the like. Thus, the material in FIGS. 3.6 could be formed in a substantially cylindrical tube in cross section with the attachments 36 and 38 in FIG. 4 representing a permanent seam pre-formed by any of the above-noted means. The substantially cylindrical, elongated tube could then be slipped over an elongated bow and the bow then attached to the top sides of the open truck box. The male and female fasteners 36 and 38 could also be corresponding strips of hook-and-loop material that adhere to each other to attach the bow cover to the bow.

Thus, there has been disclosed a novel bow cover for a support structure extending the top of one side of an open truck box to the top of the other side. A plurality of these bow structures may be used in parallel along the length of an open box.

The protective cover for the bow structure reduces wear of adjacent objects contacting the bow structure. The protective cover has a rectangular pliable member substantially equal in length to the elongated bow structure and has a width sufficient to substantially surround the elongated bow structure. At least one male fastening member is on one side of the pliable member and at least one mating female fastening member is on the other side of the pliable member such that the pliable member can be substantially folded around the elongated bow structure and attached thereto with the mating female and male fasteners. The male and female fastening members may be corresponding strips of hook-and-loop material that adhere to each other. Also, the fastening means could be a permanent seam formed by stitching, gluing, heat sealing and the like. The elongated cover in substantially cylindrical cross section could be slipped over an elongated bow and the bow attached to the open truck box.

In the preferred embodiment, a plurality of parallel spaced ribs extend longitudinally along and parallel to the length of the rectangular pliable member contacting the elongated bow structure and maintaining the pliable member in spaced relationship with it. The pliable member may be formed of extruded vinyl.

In a second embodiment, the protective cover comprises a rectangular pliable member that extends substantially the length of the elongated bow structure and again has a width sufficient to substantially surround the elongated bow structure. It also has a first layer of compressible material such as closed cell foam abutting the rectangular pliable member. A second layer of material having at least a vinyl coating thereon is attached to both the rectangular pliable member and the compressible material layer such that the vinyl-coated second layer contacts the elongated bow structure when wrapped around the bow structure.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A protective cover for an elongated support member, to reduce wear of adjacent objects contacting the support member, the cover comprising:
   a pliable member substantially equal in length to the elongated support member and having a width sufficient to substantially surround the elongated support member;
   first fastening means on one side of the pliable member; and
   second fastening means matable to said first fastening means on the other side of the pliable member such that the pliable member can be folded over the elongated support member and attached thereto with the first and second fastening means.

2. A protective cover as in claim 1 wherein the pliable member presents a bottom portion, the protective cover further including a contact surface associated with the bottom of the pliable member for abutting the elongated support member so as to maintain the pliable member in spaced relationship with the support member.

3. A protective cover as in claim 2 wherein the contact surface comprises a plurality of parallel spaced ribs on the bottom of the pliable member for contacting the elongated support member to maintain the pliable member in spaced relationship with the support member.

4. A protective cover as in claim 3 wherein the spaced ribs are parallel to the length of the pliable member.

5. A protective cover as in claim 4 wherein the spaced ribs are integrally formed with the pliable member.

6. A protective cover as in claim 5 wherein the pliable member is formed of extruded vinyl.

7. A protective cover as in claim 2 wherein the contact surface comprises:
   a first layer of compressible material abutting the pliable member; and
   a second layer of material attached to both the pliable member and the compressible material layer such that the second layer of material contacts the elongated support member when folded around the elongated support member.

8. A protective cover as in claim 7 wherein the second layer of material contacting the elongated support member is formed entirely of extruded vinyl plastic.

9. A protective cover as in claim 7 wherein the pliable member is formed of a pliable material having a vinyl coating thereon.

10. A protective cover as in claim 9 wherein the compressible material is closed cell foam.

11. A protective cover as in claim 1 wherein the first and second fastening means includes:
    a male fastening member; and
    a female fastening member such that the pliable member can be attached to the elongated support member by mating the male and female fastening members.

12. A protective cover as in claim 1 wherein the first and second fastening means includes hook-and-loop strips that adhere to each other.

13. In an elongated open vehicle body for carrying flowable material and having side panels with at least one elongated bow connecting the top of one side panel to the top of the other side panel for supporting a canvas cover thereon, a protective covering for the at least one bow comprising:
    a pliable member substantially equal in length to the elongated bow and having a width sufficient to substantially surround the elongated bow;
    first fastening means on one side of the pliable member;
    second fastening means on the other side of the pliable member such that the pliable member can be folded around the elongated bow and attached thereto with the first and second fastening means; and
    spacing means associated with the pliable member for holding the pliable member in spaced relationship with the elongated bow when folded around the elongated bow.

14. A protective covering as in claim 13 wherein the spacing means is an integral part of the pliable member and abuts the elongated bow to maintain the pliable member in spaced relationship with the elongated bow.

15. A protective covering as in claim 14 wherein the contact surface comprises a plurality of parallel, spaced ribs on the pliable member for contacting the elongated bow to maintain the pliable member in spaced relationship with the elongated bow.

16. A protective covering as in claim 15 wherein the spaced ribs are parallel to the length of the pliable member.

17. A protective covering as in claim 16 wherein the spaced ribs are integrally formed with the pliable member.

18. A protective covering as in claim 17 wherein the pliable member is formed of extruded vinyl.

19. A protective covering as in claim 14 wherein the contact surface comprises:
    a first layer of compressible material abutting the pliable member; and
    a second layer of material attached to both the pliable member and the compressible material layer such that the second layer contacts the elongated bow when folded around the elongated bow.

20. A protective covering as in claim 19 wherein the second layer of material contacting the elongated bow is formed entirely of extruded vinyl plastic.

21. A protective covering as in claim 19 wherein the second layer of material is formed of a pliable material having a vinyl coating thereon.

22. A protective covering as in claim 21 wherein the compressible material is closed cell foam.

23. A protective covering as in claim 13 wherein the first and second fastening means includes:
    a male fastening member; and
    a female fastening member such that the pliable member can be attached to the elongated bow by mating the male and female fastening members.

24. A protective covering as in claim 23 wherein:
    the first male fastening member is a strip of hook material; and
    the second mating female fastening member is a mating strip of loop material such that, when joined, the hook-and-loop material fasten to each other.

25. In an elongated open vehicle body for carrying flowable material and having side panels with at least one bow connecting the top of one side panel to the top of the other side panel for supporting a canvas cover thereon, a protective covering for the at least one bow comprising:
    a pliable member substantially equal in length to the bow and having a width sufficient to substantially surround the bow;

a plurality of male fastening members on one side of the pliable member;

a plurality of mating female fastening members on the other side of the pliable member; and a plurality of parallel, spaced ribs on the pliable member for contacting and surrounding the bow to maintain the pliable member in a spaced relationship with the bow, the spaced ribs being parallel to the length of the pliable member.

26. In an elongated open vehicle body for carrying flowable material and having side panels with at least one bow connecting the top of one side panel tot he top of the other side panel for supporting a canvas cover thereon, a protective covering for the at least one bow comprising:

a pliable member substantially equal in length to the bow and having a width sufficient to substantially surround the bow;

a plurality of male fastening members on one side of the pliable member;

a like plurality of mating female fastening members on the other side of the pliable member;

a first layer of compressible material abutting the pliable member; and a second layer of vinyl-coated material attached to both the pliable member and the compressible material layer such that the vinyl-coated material contacts the elongated bow when folded around the elongated bow.

27. A protective covering as in claim 26 wherein the first layer of compressible material is formed of closed cell foam.

28. A protective cover for an elongated support member to reduce wear caused by adjacent objects contacting the support member, the cover comprising:

an elongated, substantially cylindrical tube formed of pliable material that can be slipped over the length of the elongated support member; and a contact member having a predetermined thickness and being interposed between the substantially cylindrical tube and the elongated support member for abutting the elongated support member so as to maintain the pliable member in spaced relationship with the support member.

29. In an elongated open vehicle body for carrying flowable material and having side panels with at least one bow connecting the top of one side panel to the top of the other side panel for supporting a canvas cover thereon, a protective covering for the at least one bow comprising:

a pliable member substantially equal in length to the bow and having a width sufficient to substantially surround the bow;

a permanent seam joining the outer ends of the opposite sides of the pliable member to form an elongated tube of substantially circular cross section for sliding over and encasing the bow; and a plurality of parallel, spaced ribs on the interior of the elongated tube for contacting the bow when the elongated tube is slid over the bow to maintain the pliable member in a spaced relationship with the bow, the spaced ribs being parallel to the length of the elongated tube.

30. A protective covering as in claim 29 wherein the permanent seam is formed by sewing together the outer ends of the opposite sides of the pliable member.

31. In an elongated open vehicle body for carrying material and having side panels with at least one bow connecting the top of one side panel to the top of the other side panel for supporting a canvas cover thereon, a protective covering for the at least one bow comprising:

a pliable member substantially equal in length to the bow and having a width sufficient to substantially surround the bow;

a permanent seam joining the outer ends of the opposite sides of the pliable member to form an elongated tube of substantially circular cross section for sliding over and encasing the bow;

a first layer of compressible material abutting the pliable member on the interior of the elongated tube; and a second layer of vinyl coated material attached to at least the compressible material layer such that the vinyl coated material contacts the elongated bow when the elongated bow is encased by the elongated tube.

32. A protective covering as in claim 31 wherein the permanent seam is formed by sewing together the outer ends of the opposite sides of the pliable member.

* * * * *